Aug. 31, 1943.　　　　　E. SALSAS　　　　　2,328,500
ENDLESS FLAT ELASTIC BELT
Filed Dec. 14, 1939
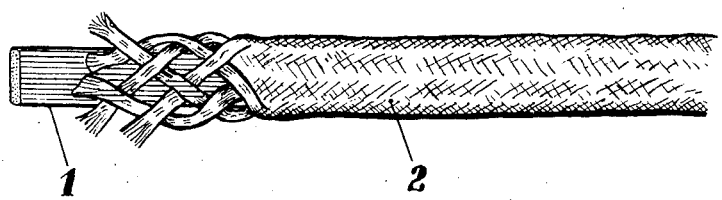
 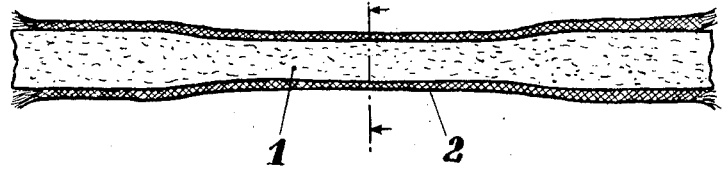
Inventor:
Emile SALSAS
BY  Attorney:

Patented Aug. 31, 1943

2,328,500

UNITED STATES PATENT OFFICE 2,328,500

ENDLESS FLAT ELASTIC BELT

Emile Salsas, Spa, Belgium; vested in the Alien Property Custodian

Application December 14, 1939, Serial No. 309,265
In Belgium January 14, 1939

1 Claim. (Cl. 74—231)

For certain purposes, such as the driving of the spindles of continuous motion appliances, it has been proposed to replace the knotted belts by endless elastic belts made of one or more threads of elastic rubber wrapped in a cotton tress. Such endless belts or elastic rings have two elasticities: an elasticity which is termed "soft" which corresponds to the free lengthening of the tress—with corresponding lengthening of the rubber core—and an elasticity termed "hard" which only enters into play when the diameter of the tress having decreased sufficiently, any traction effort necessarily transforms itself in a radial compression effort on the rubber core.

The soft elasticity is used in the mounting, which means that the endless cord is chosen shorter than the corresponding cord which has to be knotted, so as to necessitate the lengthening allowed by the "soft" elasticity to be called into action in the mounting of the cord on the contrivances to be connected; for the driving, the transmission, it is only the "hard" elasticity which intervenes. The latter is, however, very weak because it results solely from a transversal compression of the rubber which is already notably lengthened, and it can be admitted that practically, the cord suffers no deformation whatever, nor any sensible lengthening resulting from this "hard" elasticity, so that from this point of view, the rubber cord can be assimilated to an ordinary knotted cord, and that the end sought for, elasticity in the transmission—having as result a decrease of the loss of power—is not attained, in the practical case of a core composed of several strands, formed of a rubber ring buckled or folded on itself, the compression effort translates itself rather into a displacement of the strands one over the other, or in other words, by a filling up of the empty spaces formed between the strands of rubber. On the other hand, such an endless cord which would only act through its "soft" elasticity would supply a defective transmission; if one wanted to assure a sufficient strain, without any compression effort on the rubber, it would be necessary that during the tressing operation, the cotton tube should have a diameter notably larger than the rubber core, a state of things which would be inadmissible from a manufacturing point of view, and specially because of the resistance offered in the working. Lastly, such an endless cord can really only be used but in the case of pulleys or drums with grooves specially provided for round cords.

The present invention has as object the creation of an endless belt, capable of being considerably elastically lengthened without any transversal compression effort between the tress and the rubber core, that is to say, without displacement of the tress with regards to the core.

According to the present invention, the endless rubber core has a rectangular section, the textile layer or layers (cotton, camel's hair, silk, etc.) which cover this core being made of a flat tress formed directly round the core in a tressing machine. The closed ring constituting the belt has therefore, in section, a flattened rectangular shape.

It should be noted that it is not here a question of a round tubular tress which would have been flattened later, but really of a tubular flat (rectangular) tress formed directly as such, therefore by means of automatic regulated variations of the stresses of the tressing threads during the manufacturing.

The flat belt is impregnated with a latex solution, it is then passed through grooves in which it is submitted to pressure, it is then vulcanized, preferably with heat, all this with the object of forcing the core and the enveloping tress to constitute a compact block, the section of which will be uniform over the whole length and in which the constitutive elements cannot displace themselves with regards to one another, the effective lengthening of the rubber core being strictly limited by the natural lengthening allowed to the tress.

If one considers a round section cord, with rubber core, the two constituents, during the lengthening process, decrease in diameter, or in other terms, either of them decreases in section uniformly in all directions; the decrease in section, however, takes place more rapidly in the case of the tress than in that of the rubber, which goes to explain the fact that at a given moment, the tress compresses the rubber, and that the traction effort is translated on the core into a compressive effort; it is therefore not possible if one wishes to use this compressive effort, to wholly solidarize the core and the envelope.

On the contrary, with a flattened rectangular section, the lengthening of the rubber which is relatively thin is principally converted into a decrease of width, that is to say that the rubber ribbon, when lengthening, forms sections in which the relation between base and height eventually remains constant, which means a decrease, in millimeters, for instance, far more rapid and more important with regards to the width than to the thickness. The result is that by a judicious selection of the relation between base and height of the rectangular rubber section, one is enabled to obtain, in the case of the core as well as in that of the envelope, quantitative deformations of equal width—evidently within the scope allowed by the natural lengthening of the tress—so that the tress will, at no moment whatever be able to develop a transversal compressive effort on the core, on condition however, that the core and the tress owing to the impregnation and the vulcanization, form a block of which the constituting parts are unable to displace themselves with regards to each other.

Such an endless belt will therefore always work at strain and elastically, without any compressive effort and without any wear on the rubber; its life will be increased compared with that of the round section cords, the driving will be more effective, more flexible, and a decrease in the consumption of power will be the result. The adherence of such belts is evidently far superior to that of the round cords, which allows one to work at lower tension.

The annexed drawing shows clearly, in Fig. 1, how the endless belt is constituted: 1 is the rubber core and 2 the tress. Fig. 2 shows a lengthened piece of belt, and Fig. 3 shows the section at the spot where the lengthening took place.

A belt according to the present invention is specially designed to replace the driving ribbons of the spindles in the spinning looms (specially the continuous ones). The drawback of the knotting and of the sewing is done away with, which gives a shock at each passage over a spindle pulley. On the other hand, the usual ribbons have to be combined with stretchers, and the belt according to the invention functions without stretcher, whence a very important economy, as much from the material point of view as from the point of view of regulation and driving power.

Having now fully described my said invention, what I claim and desire to secure by Letters Patent, is:

An endless belt, comprising an elastic core of rectangular section of materially greater width than thickness, and an envelope united with the core, the envelope having a comparatively limited free stretch corresponding to a desired stretch or extension of the core for frictional driving grip of the belt, the cover being inherently prevented from any stretch beyond that permitting the defined stretch of the core to thereby maintain the belt as a whole against further stretch in use, the limit stretch of the cover holding the cover and core as an unstretchable unit under any stress beyond the defined stretch of the core, whereby such cover when in its limit-stretch position serves in the use of the belt to prevent such use exerting any compressive strain on the core.

EMILE SALSAS.